UNITED STATES PATENT OFFICE.

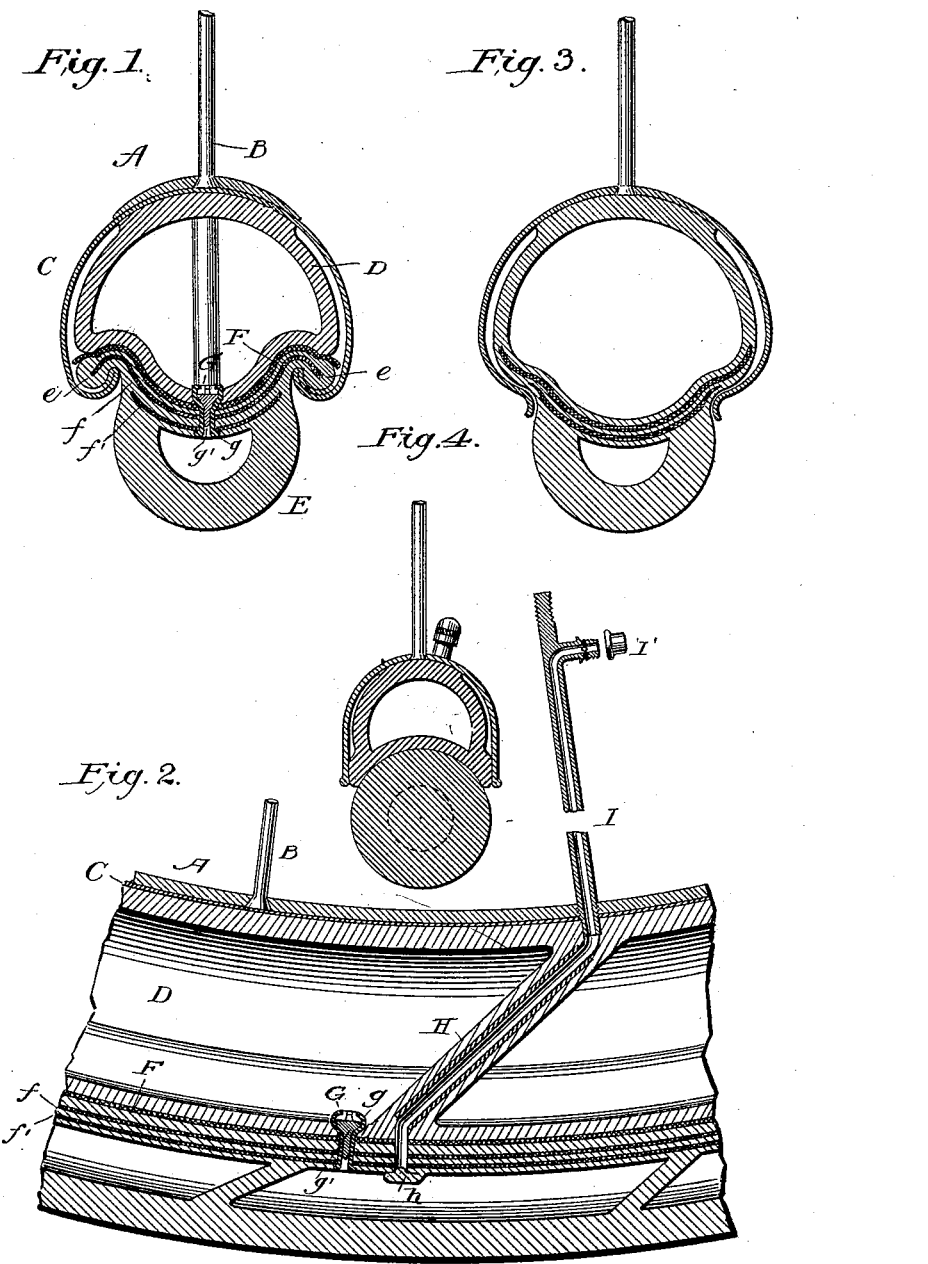

JOHN A. KIRK AND JAMES E. HOSFORD, OF WASHINGTON, DISTRICT OF COLUMBIA.

PNEUMATIC TIRE.

SPECIFICATION forming part of Letters Patent No. 508,621, dated November 14, 1893.

Application filed August 6, 1892. Serial No. 442,362. (No model.)

*To all whom it may concern:*

Be it known that we, JOHN A. KIRK and JAMES E. HOSFORD, of Washington, in the District of Columbia, have invented a new and useful Improvement in Pneumatic Tires, of which the following is a specification.

Our invention relates to wheel tires, and more particularly, to what are known as "pneumatic tires for bicycles," and analogous machines. As ordinarily constructed, the greater portion of the tire is exposed, thus rendering it, while in use, liable to become punctured. It has also been found that as the tire comes in contact with the ground and is subjected to the weight of the machine and rider, in yielding it will assume an approximately flat or elliptical form, and will in time become weak at its diametrically opposite sides, and finally give way at these points. To avoid these objections are the aims of our invention, which consists, primarily, in applying to the pneumatic tire a protecting jacket of such form that but a small portion of the tire will be exposed, and in applying to this exposed portion a reinforcing body.

The invention also consists in combining with a pneumatic tire a cushion tire provided with a chamber or chambers, the said tire being so applied that it will act automatically to supply air to the pneumatic tire as the wheel revolves.

The invention also consists in the details of construction and combinations of parts hereinafter described and claimed.

In the accompanying drawings,—Figure 1 is a cross-section through a tire having our invention embodied therein. Fig. 2 is a longitudinal section of the same. Figs. 3 and 4 are cross-sections of modifications.

Referring to Figs. 1 and 2, A represents the rim of the wheel, and B, the spokes, which may be of the usual construction.

In applying our invention we secure to the concave outer face of the rim a metallic jacket C, which extends outward on both sides of the wheel in curved lines, and has its edges bent inward, as shown, and then folded back so that two pockets or grooves will be formed at the edges with a space between them. This jacket is adapted to receive a pneumatic tire D, which may be of rubber or other appropriate material, seated therein as shown.

To the exposed portion of the pneumatic tire, between the edges of the protecting jacket, we apply a reinforcing body E. This body may be of any suitable form or material which will adapt it for the ends in view, but we prefer to construct it in the form of a cushion tire consisting of a rubber body provided with internal chambers or compartments. It is provided on its edges with two flanges *e*, which are inserted within the pockets of the jacket by which means it is held securely in place.

It will be seen that the expansion of the pneumatic tire will tend to clamp the reinforcing body securely in place so that there will be no liability of its becoming detached.

Under the foregoing construction it will be seen that the reinforcing body covers that portion of the pneumatic tire which would otherwise be exposed, so that there will be no liability of the pneumatic tire becoming punctured and rendered inoperative; at the same time, all the advantages of the pneumatic tire, as far as resilience is concerned, will be retained. It is also to be noted that by employing this protecting jacket we are enabled to construct the pneumatic tire of comparatively thin rubber, so that a great saving in material is effected.

As a further means of preventing the puncture of the pneumatic tire we propose to introduce between the same and the cushion tire one or more reinforcing strips of canvas F, and to form in the cushion tire, near its base, strips of canvas or other suitable material *f f'*.

In order that the pneumatic tire may be supplied with air and constantly maintained in a distended condition we connect the chamber in the cushion tire with the external air and apply a valve arranged to admit air thereto but prevent its return, and also connect this chamber with the interior of the pneumatic tire by means of a valve arranged to allow the air to enter the pneumatic tire but prevent its escape. This construction constitutes in effect an automatic pumping device, the rotation of the wheel causing the air to be drawn into the cushion tire and forced into the pneumatic tire. The air enters the cushion tire through a pipe H, which extends through the pneumatic tire D, between the abutting ends of the same. This pipe is provided with a check valve $h$, in the form of a hinged flap closing the end of the pipe, the construction being such that the valve will yield to admit air to the cushion tire but will effectually prevent its exit therefrom. This pipe connects at the rim of the wheel with a passage I, which is preferably extended through one of the spokes, and terminates near the center of the wheel, where it is provided with a cap I', which may be removed to allow the tire to be inflated in the first instance, and then applied. By having the pipe terminate near the center of the wheel there will be no liability of water or dust entering the same. Instead of providing a passage in the spoke, a pipe may be extended from the rim along one of the spokes.

The cushion tire connects with the pneumatic tire through an opening which is closed by a check valve G. This check valve is in the form of a tube $g$, having its end bent inward within which is mounted the vertically-moving valve proper $g'$; the arrangement being such that the valve will permit the air to enter the pneumatic tire but prevent its return. Under the foregoing arrangement it will be observed that as the cushion tire is subjected to pressure, and is relieved therefrom, in expanding it will draw the air in through its valve, and when again subjected to pressure will force the same into the pneumatic tire, thus constantly supplying the tire with air and returning it in a distended condition.

It is, of course, obvious that more than one of the chambers in the cushion tire may be provided with this pumping mechanism, the action being the same in all cases.

While we have described and illustrated the reinforcing body in the form of a separate cushion tire it may be, as shown in Fig. 3, formed in one piece with the pneumatic tire and the projecting jacket may serve as the rim, or, as shown in Fig. 4, it may be in the form of a solid rubber tire cemented to the exposed portion of the pneumatic tire.

Having thus described our invention, what we claim is—

1. The combination with the concave jacket having its edges turned in to form pockets, of a pneumatic tire located within said jacket, and a reinforcing body provided with thickened edges or shoulders seated in said pockets, whereby the parts are held together.

2. The combination of a pneumatic tire, a reinforcing tire having interior air chambers, and communicating passages between said interior air chambers and the interior of the pneumatic tire.

3. The combination of the pneumatic tire, the reinforcing body applied thereto and provided with an air chamber connecting with the interior of the pneumatic tire and with the external air, the inwardly-opening valve admitting air to the reinforcing body and the outwardly-opening valve controlling its escape therefrom.

4. The combination of the pneumatic tire, the reinforcing body applied thereto and provided with chambers, the pipe extending through the pneumatic tire and connecting with the chambers in the reinforcing body, the inwardly-opening valve applied to said pipe and the outwardly-opening valve controlling the escape of air from the reinforcing body into the pneumatic tire.

In testimony whereof we hereunto set our hands, this 30th day of July, 1892, in the presence of two attesting witnesses.

JOHN A. KIRK.
JAS. E. HOSFORD.

Witnesses:
W. R. KENNEDY,
RAYMOND F. BARNES.